United States Patent [19]

Manzoni

[11] 4,362,068

[45] Dec. 7, 1982

[54] REMOTE CONTROL DEVICE FOR OUTSIDE REARVIEW MIRROR ADJUSTABLE FROM INSIDE OF A MOTOR VEHICLE

[75] Inventor: Stephane Manzoni, Saint Claude, France

[73] Assignee: Société Anonyme dite: Manzoni-Bouchot, Saint Claude, France

[21] Appl. No.: 57,773

[22] Filed: Jul. 16, 1979

[30] Foreign Application Priority Data

Jul. 18, 1978 [FR] France .................................. 78 21303
Dec. 20, 1978 [FR] France .................................. 78 35387

[51] Int. Cl.³ .................................................. F16C 1/10
[52] U.S. Cl. .................................................. 74/501 M
[58] Field of Search ........................ 74/501 R, 501 M

[56] References Cited

U.S. PATENT DOCUMENTS

| 3,251,238 | 5/1966 | Fuqua | 74/501 |
| 3,369,427 | 2/1968 | Brighton et al. | 74/501 M |
| 3,618,420 | 11/1971 | Horwitt et al. | 74/501 M |
| 3,719,105 | 3/1973 | Horwitt et al. | 74/501 M |

FOREIGN PATENT DOCUMENTS

| 2263213 | 12/1972 | Fed. Rep. of Germany | 74/501 M |
| 2334535 | 7/1977 | France | 74/501 M |
| 958146 | 5/1964 | United Kingdom | 74/501 |

Primary Examiner—Kenneth Dorner

[57] ABSTRACT

Remote control device for outside rearview mirrors adjustable from inside a vehicle by means of a cable transmission, comprising a body in which the cables are guided in parallel to the longitudinal axis of the said body.

The body 1 is fitted on the vehicle door with its longitudinal axis $XX_1$ parallel to the longitudinal axis of the vehicle and the semi-spherical control member 8 is integral with an operating lever 14 perpendicular to the axis of the said semi-spherical member 8 and extending inside the vehicle at right angle with the longitudinal axis of the body 1 when the said semi-spherical member is in the neutral position, the said body being provided with openings 16, 17, 17a the edges of which ensure the guiding of the operating lever and of the semi-spherical control member.

The invention is used for the remote control of rearview mirrors.

5 Claims, 25 Drawing Figures

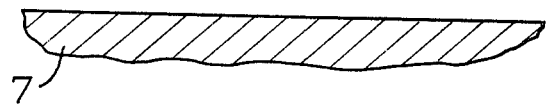
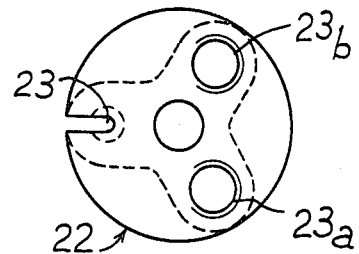
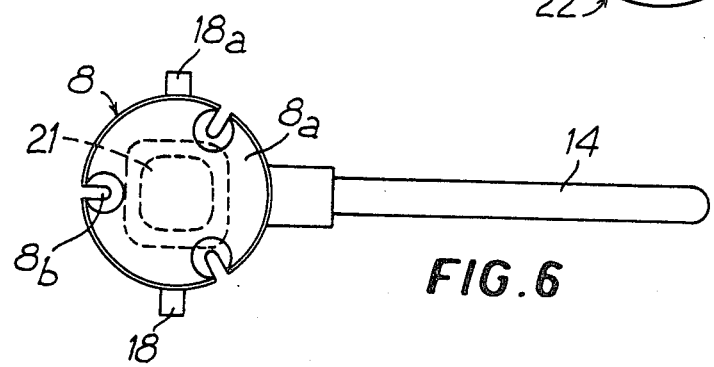
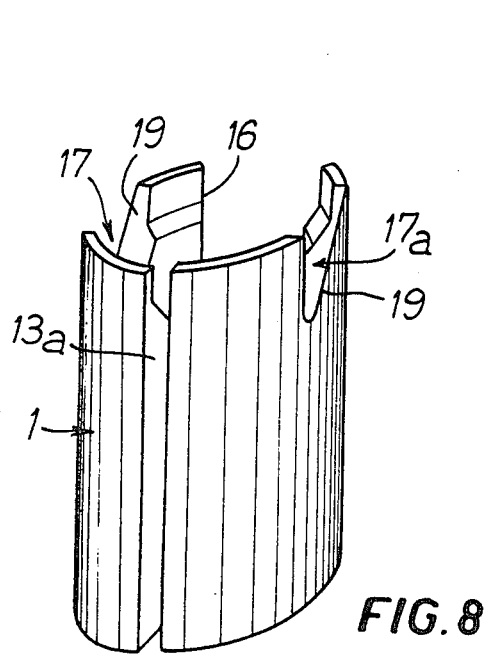
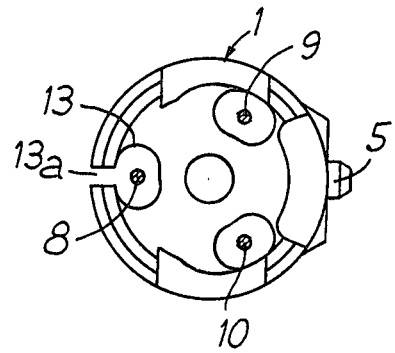

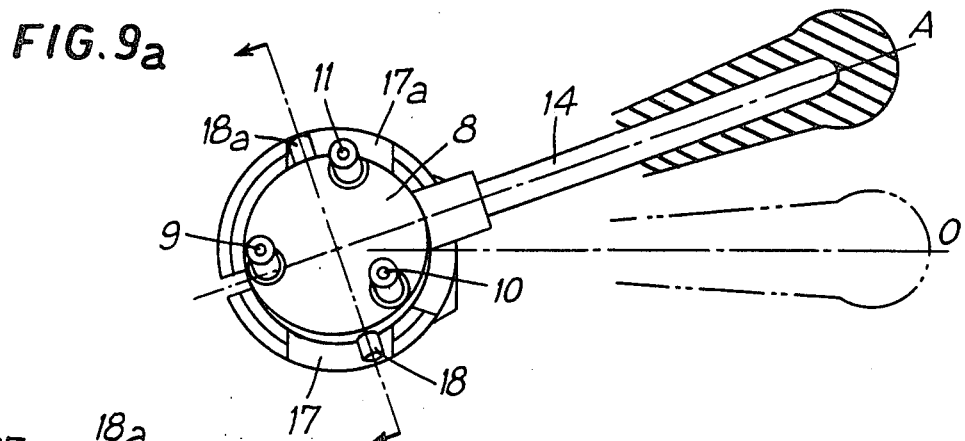
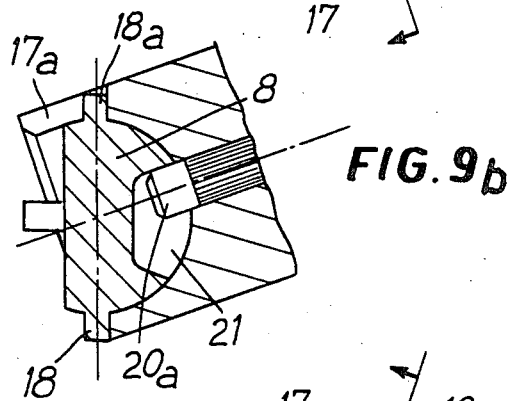
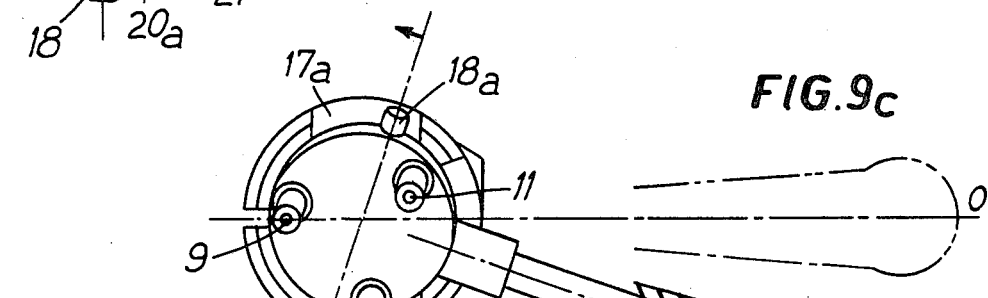
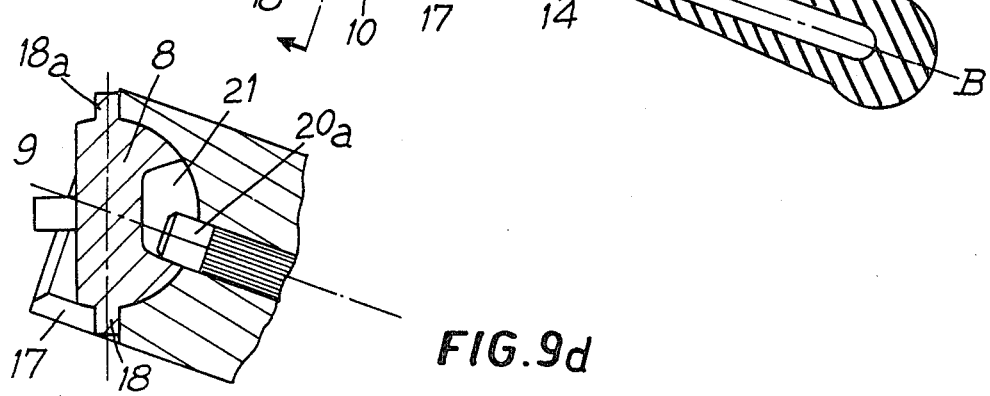

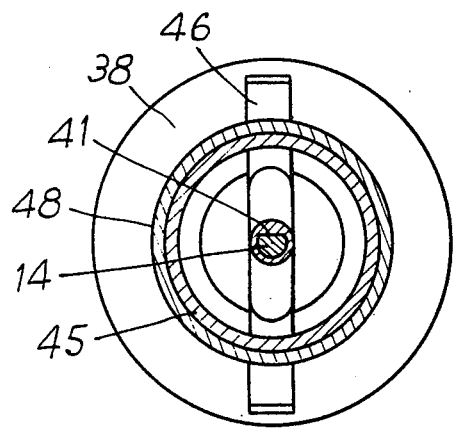
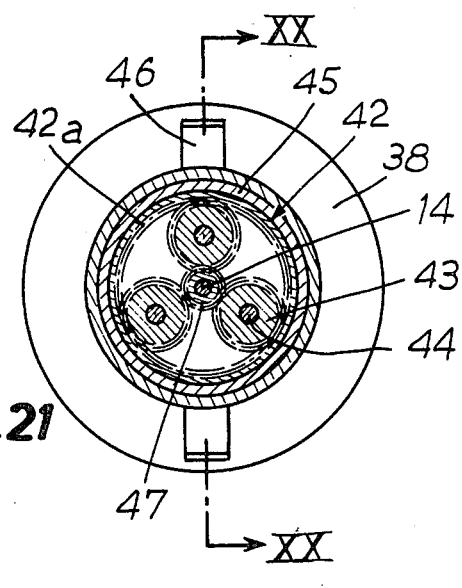
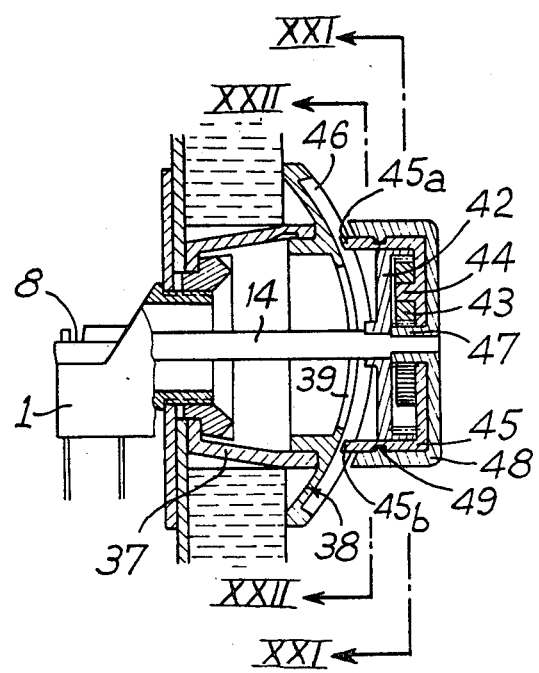
FIG. 22
FIG. 21
FIG. 20

REMOTE CONTROL DEVICE FOR OUTSIDE REARVIEW MIRROR ADJUSTABLE FROM INSIDE A MOTORVEHICLE

For controlling an outside rearview mirror from inside a vehicle, it is known to use devices such as that described in U.S. Pat. No. 2,931,245 wherein the mirror is pivotally mounted in a casing by means of a ball joint connected by three transmission cables to a control means constituted by a ball joint provided with a control lever. The control device which is generally mounted on the door panel of the vehicle is arranged in such a way that, in its neutral position, the axis of the control lever is parallel to the transmission cables at their outlet from the said device, and perpendicular or substantially so to the window.

In large-sized vehicles, the outlines of the doors are very thick, which makes it possible to fit the said control device on the door panel without any difficulty. But, in the standard-size vehicles, the outline of the door being thinner, it is virtually impossible, due to the space length required by the said control device, to fit it on the door panel because of the position of the transmission cables at their outlet from the device and which come into abutment against the door window.

To overcome this cramped situation and reduce the space required by the control device in the inside part of the vehicle door, between the outer panel thereof and the window, control devices have been designed which are described in particular in U.S. Pat. Nos. 3,552,228, 3,719,105 and 3,838,608.

Said control devices are mounted on the door panel in such a way that the axis of the operating lever is always at right angle with the window when in the neutral position whereas the axis of the transmission members at their outlet from the device is parallel to the window.

To this end, the cables which are fixed to the ball and socket integral with the operating lever are subjected in the body of the control device, to a change of direction of an angle substantially equal to 90°.

However, such a change in the direction of the cables involve harmful frictions in the transmission thereby necessitating an increase of the manoeuvering force with respect to the direct control indicated above. Also, there could result a faster wear of the cables in their sheath.

According to the present invention, a remote control device is used for outside rearview mirrors adjustable from inside the vehicle by means of a cable transmission, comprising a body in which the cables are guided in parallel to the longitudinal axis of the said body which is provided with a spherical housing against which rests a semi-spherical control member which is fast with one of the cable ends, wherein the said member is fitted on the vehicle door with its longitudinal axis parallel to the longitudinal axis of the vehicle and wherein the semi-spherical control member is fast with an operating lever which is perpendicular to the axis of the said semi-spherical member and extending inside the said vehicle at right angle with the longitudinal axis of the body when the said semi-spherical member is in the neutral position, said body being provided with openings whose edges ensure the guiding of the operating lever and of the semi-spherical control member.

This arrangement makes it possible to use an operating lever whose axis is perpendicular to the window when the spherical control member is in neutral and to dispose the axis of the transmission cables at their outlet from the device, in parallel to the window.

The transmission cables, on the contrary, are mounted directly on the ball and socket as in U.S. Pat. No. 2,931,245, without necessitating any detrimental change of direction.

According to one characteristic of the invention, the semi-spherical control member is provided in its spherical part, with a truncated cone-shaped cavity of quadrangular cross-section in which is engaged one of the ends of the central rod mounted on the body, so that the semi-spherical member and next, the mirror, are guided along a quadrangular movement.

It is possible with this arrangement to obtain a displacement of the mirror along a quadrangular path, which is impossible to obtain with the known devices.

According to another characteristic of the invention, the body is provided with a groove whose axis is parallel to the longitudinal axis of the said body and in which the operating lever, integral with the semi-spherical control member is mounted to slide and to pivot about its axis.

It has been noted that the operating lever can operate in the same way with a longitudinal guide means situated, not in the body, but rather in the decorative flange mounted on the body and resting on the inside lining of the door.

According to another characteristic, there is provided on the lever a toothed ring wedged thereon and meshing with differential pinions driven in rotation by a planetary pinion, integral with an operating knob which is fast with the said decorative flange. The object of this arrangement is to reduce the control in rotation of the operating knob actuating the operating lever and to obtain a control which requires much less power to actuate the operating knob, and a more accurate adjustment of the mirror.

Other characteristics and advantages of the invention will be more readily understood on reading the following description of several embodiments, reference being made to the accompanying drawings, in which:

FIG. 5 is a view of the disengaged abutment along arrow F of FIG. 3;

FIG. 6 is a view of the disengaged semi-spherical control member along arrow F of FIG. 3;

FIG. 7 is a view of the body along arrow F of FIG. 3;

FIG. 8 is a perspective view of the body;

FIGS. 9a to 9d are views of the different positions of the semi-spherical control member;

FIG. 20 is a cross-section view along XX—XX of FIG. 21 of another embodiment of the control device;

FIG. 21 is a cross-sectional view along XXI—XXI of FIG. 20;

FIG. 22 is a cross-sectional view along XXII—XXII of FIG. 20.

Figure 2:
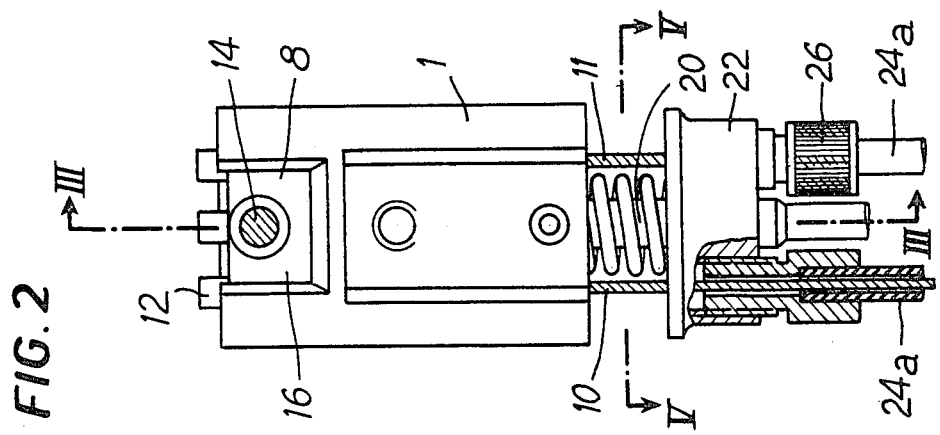
FIG. 2 is a plan view along II—II of FIG. 1.
Figure 1:
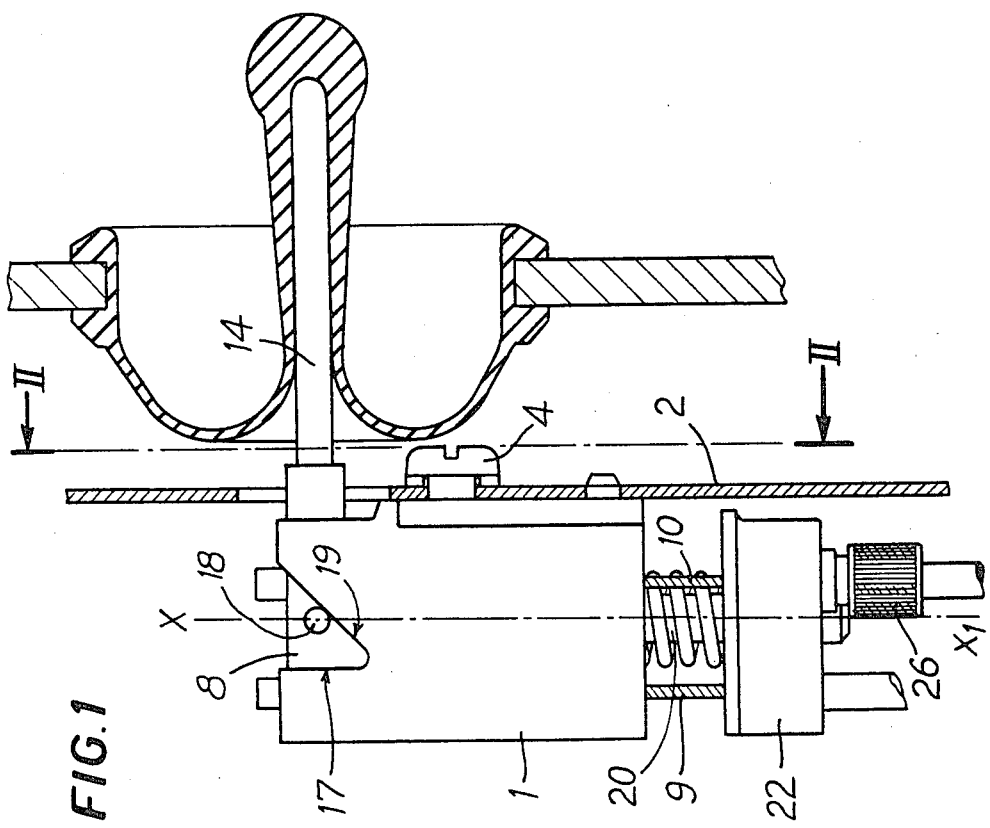
FIG. 1 is a plan view of an embodiment of the remote control device for rearview mirrors according to the invention.
Figure 3:
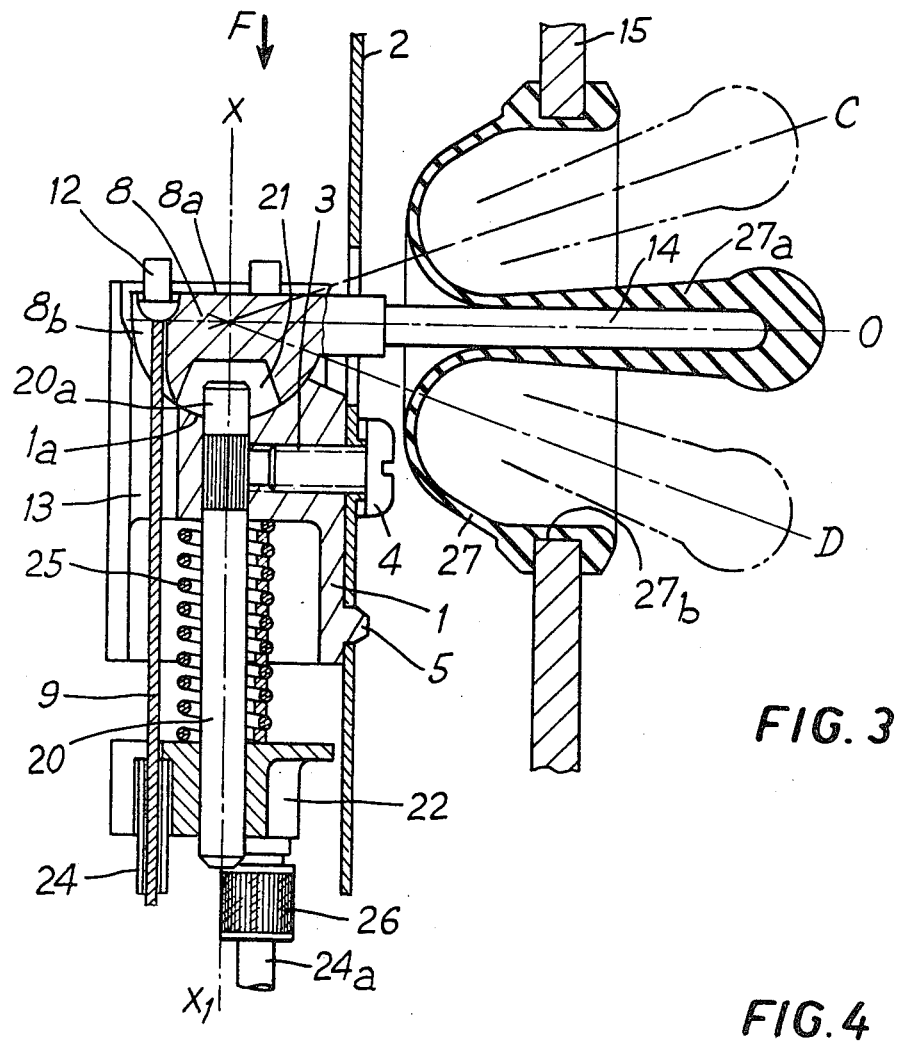
FIG. 3 is a plan and cross-sectional view along III—III of FIG. 2.
Figure 4:
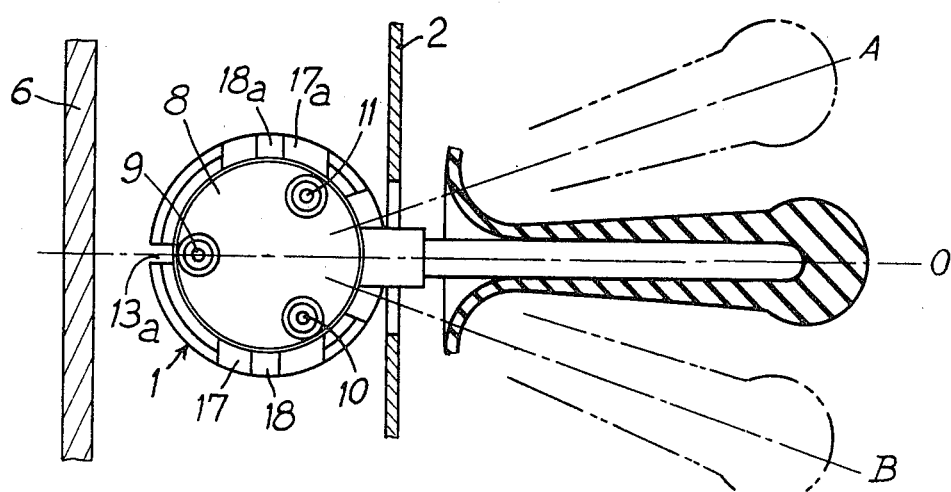
FIG. 4 is an elevational view along arrow F of FIG. 3.

The control device according to the invention shown in FIGS. 1 to 4 is intended to ensure the remote control of a mirror, not shown, pivotally mounted in a casing by means of a ball joint or the like, connected by three transmission cables to the said control device.

The part corresponding to the fitting of the mirror in its casing which is well known, will neither be described nor shown, but mention will be made throughout the description, of the position of the mirror which can move in a "sky-to-ground" direction or in a "left-to-right" direction, said directions corresponding to movements of the control lever of said device.

FIGS. 1 to 4 show one embodiment of the control device which comprises a cylindrical body 1, mounted on the inside panel plate 2 of a vehicle door by means of a flat part provided with a tapped hole 3 in which is engaged a fastening screw 4 on the plate 2 provided with a hole into which is engaged an indexing lug 5 formed in the body 1, so that said body 1 is positioned between the window 6 (FIG. 4) and the plate 2 with its longitudinal axis $XX_1$ parallel to the axis of the vehicle, the wheels of which rest on the ground 7.

The body 1 is provided at one of its ends, with a spherical housing 1a (FIG. 3) in which a semi-spherical control member 8 is mounted to oscillate (FIGS. 3 and 6), which member has a plane face 8a comprising slots 8b in which are engaged transmission cables 9, 10, 11, which cables are provided at their ends with bosses 12 resting against the plane face 8a of the control member 8 and are connected at their other end to the means provided for pivoting the mirror, which means is not shown in the drawing.

The cables 8, 9, 10 are placed in parallel to the axis $XX_1$ of the body in passages 13 one of which at least is provided with a slot 13a communicating with the outside.

At right angle with the axis of the semi-spherical control member 8, there is mounted on the latter an operating lever 14 which extends inside the vehicle beyond the lining 15 of the door along a direction perpendicular to the axis $XX_1$ of the body when the semi-spherical control member 8 is in the neutral position O, i.e. when its axis merges with the axis $XX_1$. The operating lever 14 extends outside the body 1 by an opening 16 of quadrangular shape.

On either side of the said opening 16 there are provided two diametrically opposed openings 17, 17a (FIG. 8) inside which move studs 18, 18a integral with the semi-spherical member 8, against helical gradients 19 of the said openings thereby converting the rectilinear movement of the lever 14 into a pivoting movement of the spherical member 8 as shown in FIGS. 9a and 9d.

Co-axially to the axis $XX_1$, there is mounted in the body 1, a rod 20, one of the ends 20a of which extends inside a truncated cone-shaped cavity 21 of quadrangular cross-section provided in the spherical portion of the semi-spherical member, so that the said member and as a result, the mirror, are guided along a quadrangular path.

On the rod 20 on the side opposite the semi-spherical member 8, is slidably mounted a stop washer 22 (FIGS 1,2,3 and 5) provided with openings 23 for the free passage of the cables 9, 10, 11 whose sheaths 24 are supported on the said stop washer 22 against the action of a spring 25 provided around the rod 20 and resting respectively against the body 1 and against the washer 22. This arrangement makes it possible to control the tension on each cable and the breaking of the semi-spherical member 8 in its housing 1a.

A special way to assemble the cables 10 and 11 is prescribed in order to allow the control of their tension and tapped holes 23a, 23b, are provided in the washer to this effect, in which holes are screwed sleeves 26 allowing the free passage of the cables 10, 11 and against which rests the sheaths 24a of the said cables.

Between the door panel 15 and the control device, there is provided a bellows 27 made of resilient material whose central portion is extended by a tubular part 27a covering up the operating lever 14 which extends inside the vehicle and the peripheral edge of which is provided with a groove 27b in which is engaged the edge of the door panel 15.

Figure 10:
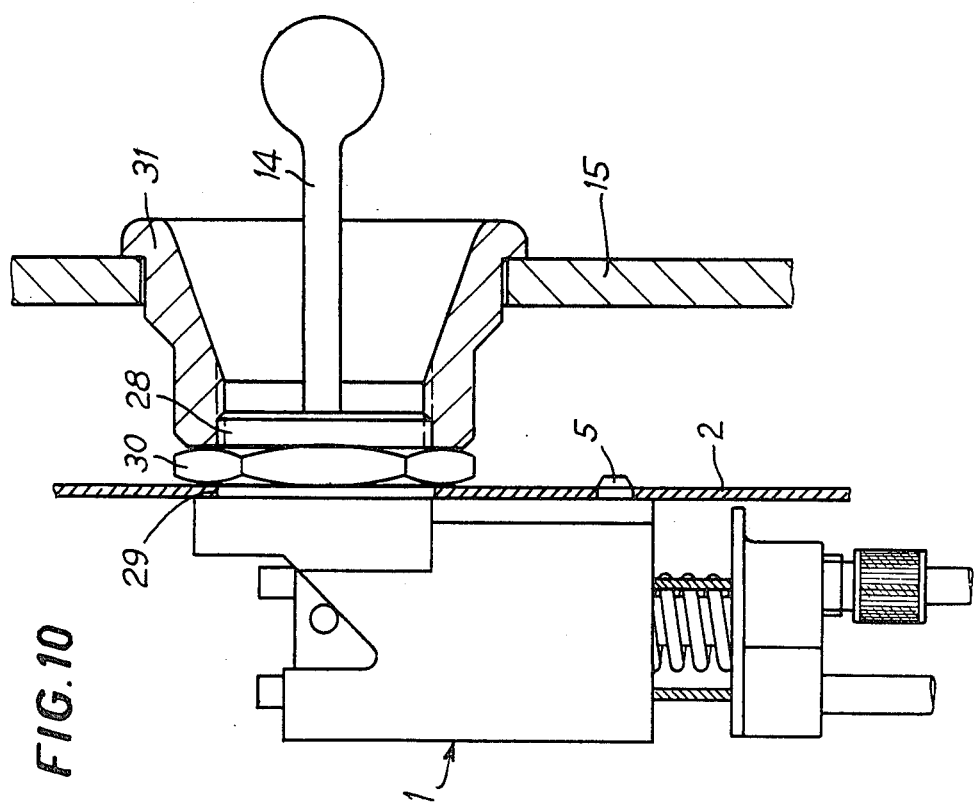
FIG. 10 is a plan view of a variant assembly of the control device.
Figure 12:
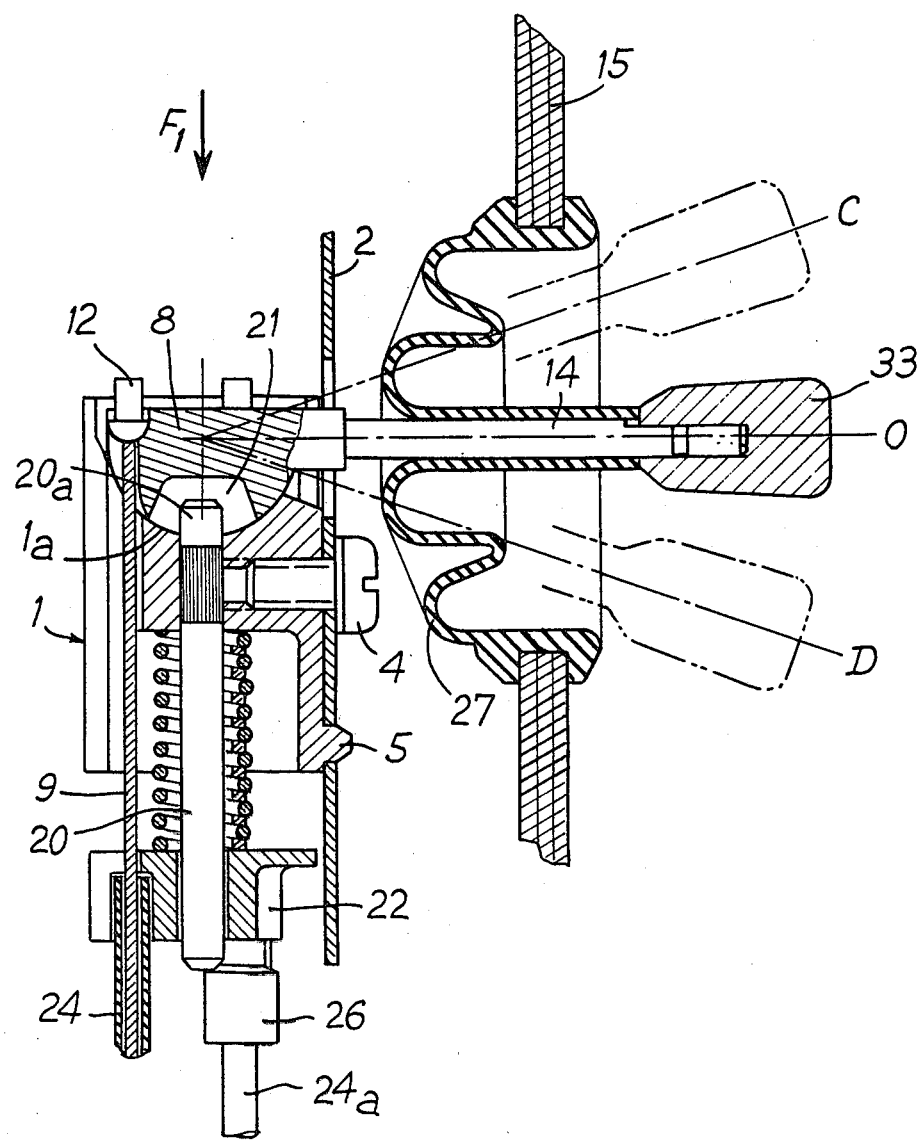
FIG. 12 is a plan and cross-sectional view along XII—XII of FIG. 11.
Figure 13:
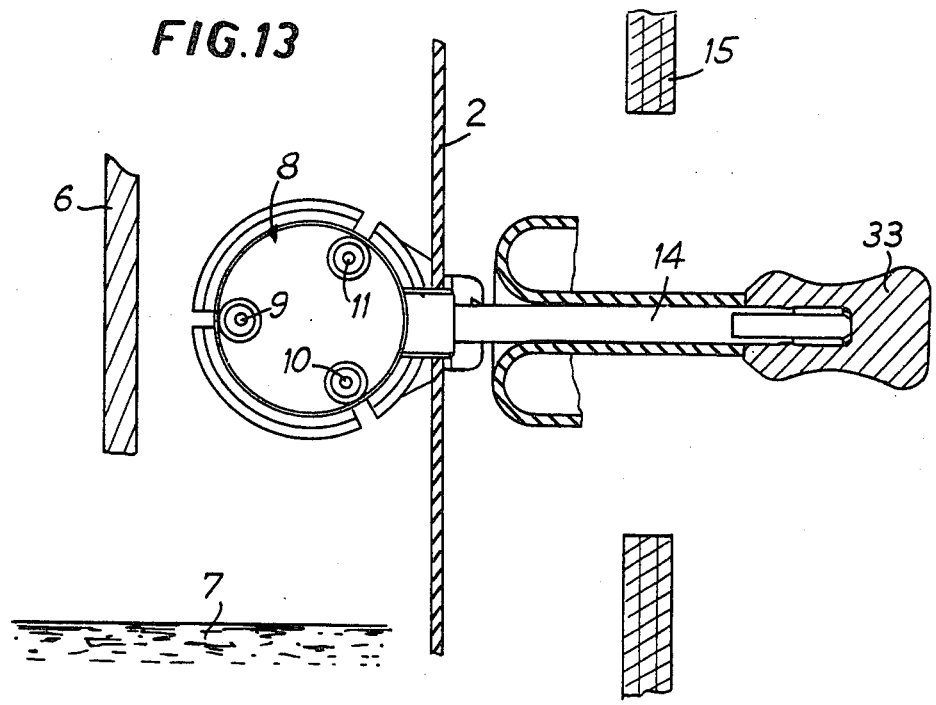
FIG. 13 is an elevational view along arrow F1 of FIG. 12.

FIG. 10 shows a variant way to assemble the body 1 on the panel 2 wherein the screw 4 was replaced by a tubular extension 28 of the body 1 in which is engaged the operating lever 14 the said extension 28 being mounted in a hole 29 of the panel plate of the car door on which is fastened the body 1 by means of a nut 30 screwed on a threaded portion of the tubular extension 28. A decorative protection member 31 placed between the lining panel 15 and the control device is screwed on the threaded part of the tubular extension 28.

The control device according to the invention operates as follows:

To obtain the "sky-to-ground" movement of the mirror, the lever 14 which is initially in the neutral position O (FIGS. 4 and 9a to 9d) is actuated and brought to the position A or to the position B.

During this rectilinear vertical displacement of the lever 14, the semi-spherical control member 8 is guided by means of radial studs 18, 18a which are in contact with helical gradients 19 of the openings 17, 17a of the body 1. As a result, the rectilinear movement of the lever 14 is converted into a rotation movement of the control member 8, which acts on the cables 10 and 11, connected to the support of the mirror, in order to urge same with a "sky-to-ground" movement.

To obtain the "left-to-right" movement of the mirror, the lever 14, initially in the neutral position O (FIG. 3) is actuated in order to bring it to the position C or to the position D. During this rectilinear and horizontal displacement of the lever, the control member 8 rotates about the axis perpendicular to the axis $XX_1$, i.e. along the axis of the radial studs 18, 18a. There results therefrom an action on the cables 9, 10, 11 which are connected to the mirror support in order to act on same with a "left-to-right" movement. The displacement of the semi-spherical control member 8 is defined in both cases by the action of the rod 20 on the faces of the truncated cone-shaped housing 21 thereby giving a square or quadrangular course to the member 8 and to the mirror.

FIGS. 11 to 15 show a variant embodiment of the rearview mirror control device according to the invention which is arranged in the same way and which is composed of the same members as those previously described. However, the guiding of the semi-spherical member in the body has been modified in that the studs 18, 18a have been removed as well as the openings 17, 17a in the body.

In this case, there is provided in the body 1 a groove or slot 32 whose axis is parallel to the longitudinal axis $XX_1$ of the said body and in which the lever 14 is mounted to slide and to pivot about its axis, which lever comprises at its end, a knob 33 of quadrangular cross-section to facilitate the gripping in rotation.

Figure 14:
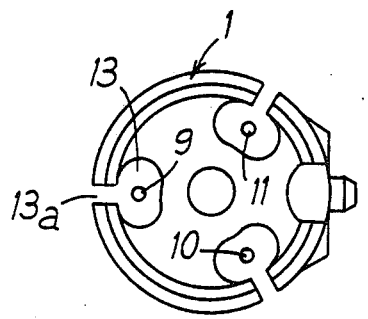
FIG. 14 is an elevational view of the body, along arrow F1 of FIG. 12.
Figure 15:
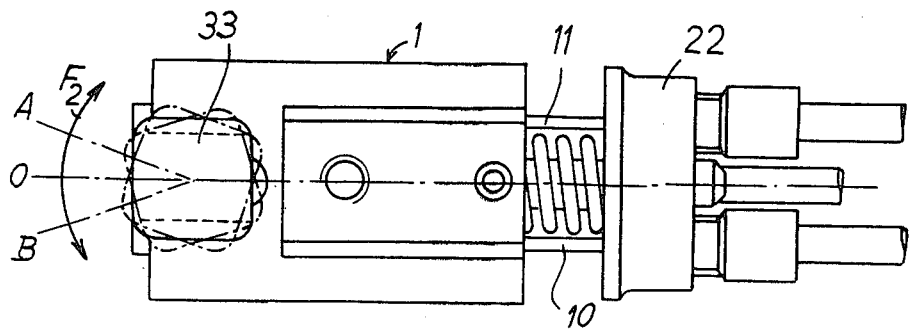
FIG. 15 is a plan view of the device showing the rotation of the control pin.

As shown in FIG. 14, all three passages 13 for the cables 9, 10, 11 in the body are provided with a slot 13a for introducing the said cables into their passages.

In this embodiment, the semi-spherical member 8 is guided only from the groove 32 provided in the body.

In order to obtain the "sky-to-ground" movement of the mirror, the knob 33 of the lever 14 is actuated, said lever being initially in the neutral position O, so as to bring said knob to the position A or to the position B by rotation along arrow F2 about the axis of the lever 14.

During this rotational movement of the lever 14, the semi-spherical member 8 acts on the cables 10 and 11 connected to the mirror support, in order to urge it with a "sky-to-ground" movement.

To obtain the "left-to-right" movement of the mirror, the knob of the lever 14 initially in the neutral position O, is actuated and brought to the position C or to the position D. During this rectilinear and horizontal movement of the lever 14 guided in the groove 32, the control member 8 is rotated along an axis perpendicular to the axis $XX_1$ and there results therefrom an action on the cables 9, 10, 11 which cables act on the mirror support in order to move it according to a "left-to-right" movement.

Figure 11:
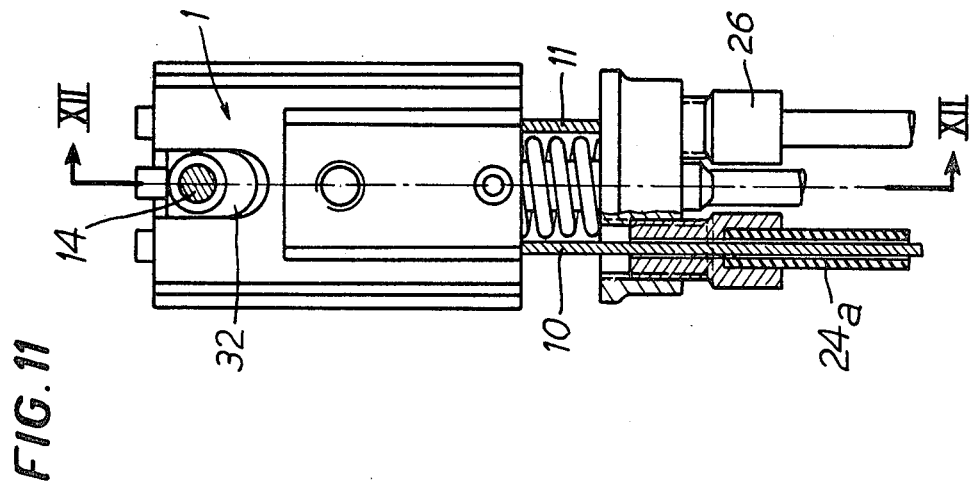
FIG. 11 is a plan view of another embodiment of the control device according to the invention.
Figure 16:
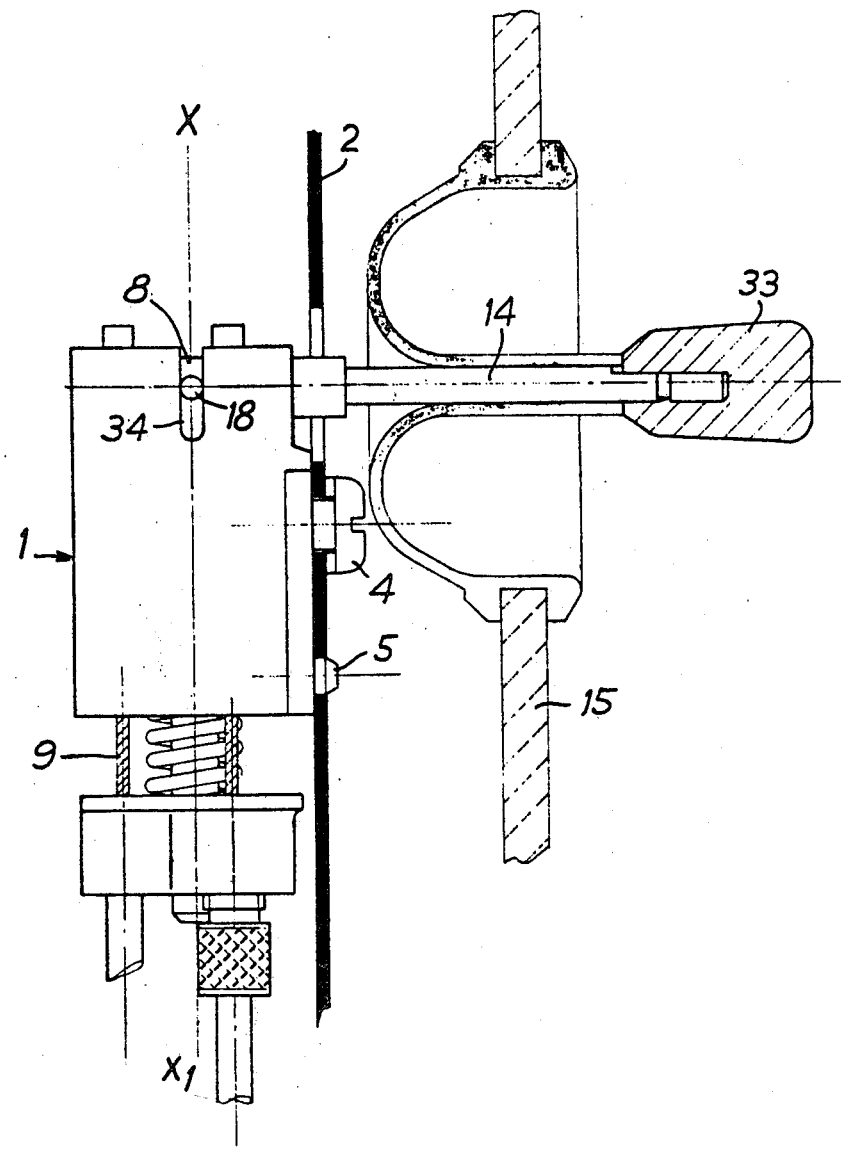
FIG. 16 is a plan view of a variant embodiment of the device shown in FIG. 11.

FIG. 16 shows a variant embodiment of the device shown in FIG. 11, wherein the semi-spherical member 8 is provided with two studs 18, 18a which are mounted to slide and to pivot in the grooves 34 of the body 1 whose axes are parallel to the axis $XX_1$ of the said body.

Figure 17:
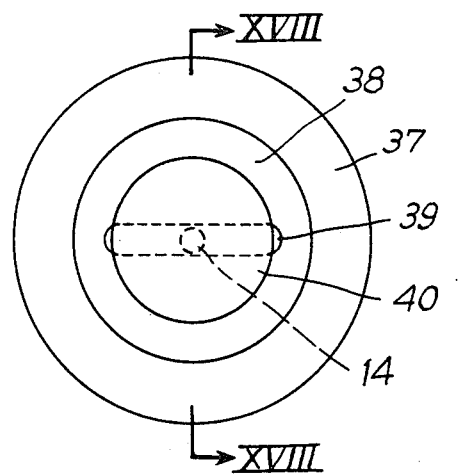
FIG. 17 is an elevational front view of another embodiment of the control device.
Figure 18:
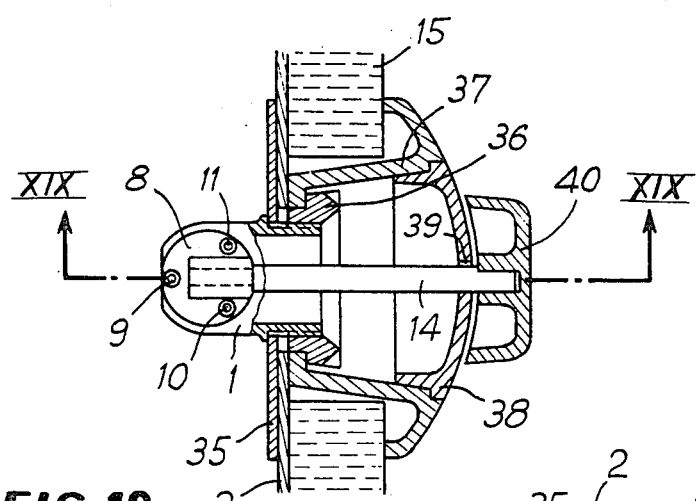
FIG. 18 is a cross-sectional view along XVIII—XVIII of FIG. 17.
Figure 19:
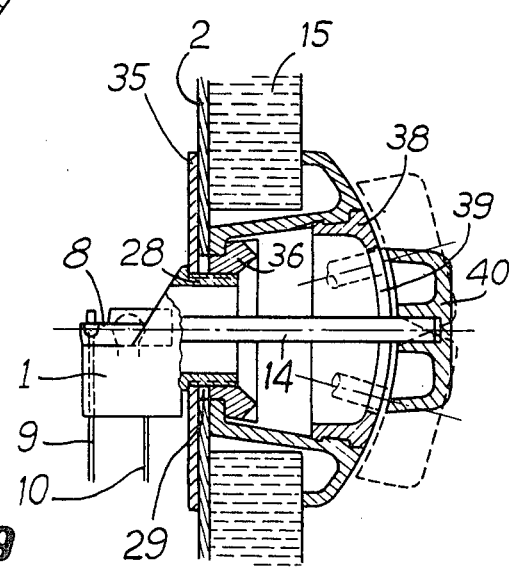
FIG. 19 is a cross-sectional view along XIX—XIX of FIG. 18.

FIGS. 17, 18 and 19 show an embodiment of the rearview mirror remote control device similar to the one indicated hereinabove and comprising a body 1 provided with a semi-spherical housing in which a semi-spherical control member 8 is mounted to oscillably mounted, and on which member are fastened by one of their other end to the mirror pivoting means.

Sideways, the body 1 is provided with an extension 28 which is engaged in a hole 29 of a door panel plate 2 with interposition of a support plate 35, the said extension 28 having a threaded portion on which is screwed a nut 36 retaining a crosspiece 37 in position of abutment against the plate 2, which crosspiece crosses through the lining 15 of the door and is supported by the latter.

On said crosspiece 37 is secured a decorative piece 38 mounted for example by clipping and provided with a groove 39 whose axis is parallel to the longitudinal axis of the body 1 and in which an operating lever 14 is mounted to slide and to pivot about its axis, said lever 14 being at one of its ends integral with the semi-spherical control member 8 and of which the other end extending outside the decorative piece is provided with an actuating knob.

This arrangement makes it possible to act on the semi-spherical control member by removing the groove on the body 1.

FIGS. 20, 21, 22 show a variant embodiment wherein a reduction is interposed between the actuating knob and the rod 14 to facilitate the rotation movement.

At one end of the rod 14 opposite the semi-spherical member 8, there is provided a flat piece 41 on which is engaged a toothed wheel 42 whose inner teeth 42a mesh with satellite pinions 43 rotatably mounted on the axes 44 of a planet-holder 45 comprising two lugs 45a, 45b engaged in a groove 46 provided on the outer face of the decorative piece 38. Said arrangement permits to immobilize the planet holder 45 with respect to the decorative piece 38.

The satellite pinions 43 mesh with a planetary or central pinion 47 which is fast with an actuating knob 48 and which is mounted for free rotation on the end of the axis 14 which is provided with a cylindrical part coming next to the flat portion 41.

The knob 48 is held in position by means of a circular groove 49 which is engaged in a corresponding groove provided on the planet-holder 45.

To set the rod 14 in rotation, it is necessary to actuate the knob 48 whose planetary pinion 47 drives, by means of the satellite pinions 43, the toothed wheel 42 which is fast with the axis 14. As a result, a reduction occurs between the actuating knob 48 and the axis 14 ensuring an easier operation.

Various modifications may of course be made by any one skilled in the art to the processes or devices hereinabove described, by way of example only and not restrictively, without departing from the scope of the invention.

What is claimed is:

1. A remote control device for an outside rearview mirror adjustable from inside the vehicle by means of a cable transmission, comprising a body and a plurality of cables extending through the body along a substantially straight course and guided therein substantially in parallel to the longitudinal axis of the said body, the body being provided with a spherical socket against which rests a semi-spherical control member which is fast with one of the cable ends, wherein the said body is fitted on a vehicle door with its longitudinal axis in parallel to the longitudinal axis of the vehicle and wherein the semi-spherical control member is fast with an operating lever which is perpendicular to the axis of the said semi-spherical member and extending inside the said vehicle at a right angle to the longitudinal axis of the body when the said semi-spherical member is in the neutral position, said body being provided with two diametrically opposed openings whose edges ensure the guiding of the operating lever and of the semi-spherical control member having helical gradients against which move two studs integral with the semi-spherical control member, so that the movement of said studs against the helical gradients imparts a rotary movement to the semi-spherical member, the said body being provided between the two diametrically opposed openings with a third quadrangular opening in which moves the said control lever.

2. A remote control device for an outside rearview mirror adjustable from inside the vehicle by means of a cable transmission, comprising a body and a plurality of cables extending through the body along a substantially straight course and guided therein substantially in parallel to the longitudinal axis of the said body, the body being provided with a spherical socket against which rests a semi-spherical control member which is fast with one of the cable ends, wherein the said body is fitted on a vehicle door with its longitudinal axis in parallel to the longitudinal axis of the vehicle and wherein the semi-spherical control member is fast with an operating lever which is perpendicular to the axis of the said semi-spherical member and extending inside the said vehicle at a right angle to the longitudinal axis of the body when the said semi-spherical member is in the neutral position, said body being provided with openings whose edges ensure the guiding of the operating lever and of the semi-spherical control member, the semi-spherical control member being provided in its spherical part with a truncated cone-shaped cavity of quadrangular cross-section in which is engaged one of the ends of a central rod mounted on the body, so that the semi-spherical member and next, the mirror, are guided along a quadrangular movement.

3. A remote control device for an outside rearview mirror adjustable from inside the vehicle by means of a cable transmission, comprising a body and a plurality of cables extending through the body along a substantially straight course and guided therein substantially in parallel to the longitudinal axis of the said body, the body being provided with a spherical socket against which rests a semi-spherical control member which is fast with one of the cable ends, wherein the said body is fitted on a vehicle door with its longitudinal axis in parallel to the longitudinal axis of the vehicle and wherein the semi-spherical control member is fast with an operating lever which is perpendicular to the axis of the said semi-spherical member and extending inside the said vehicle at a right angle to the longitudinal axis of the body when the said semi-spherical member is in the neutral position, said body being provided with openings whose edges ensure the guiding of the operating lever and of the semi-spherical control member, the body being cylindrical and secured to an inside panel plate or to a door panel by means of a flat part provided with a tapped hole in which is engaged a fastening screw and comprising a centering stud, the screw and stud having axes which are perpendicular to the longitudinal axis of the body.

4. A control device as claimed in claim 3, wherein a bellows in resilient material is positioned between the door panel and the control device.

5. A control device as claimed in claim 4 wherein the center of the bellows is extended by a tubular portion which ensures the covering up end of the operating lever extending inside the vehicle.

* * * * *